July 17, 1923.
C. J. C. W. HYNE
APPARATUS FOR AERATING LIQUIDS
Filed July 26, 1922
1,462,063
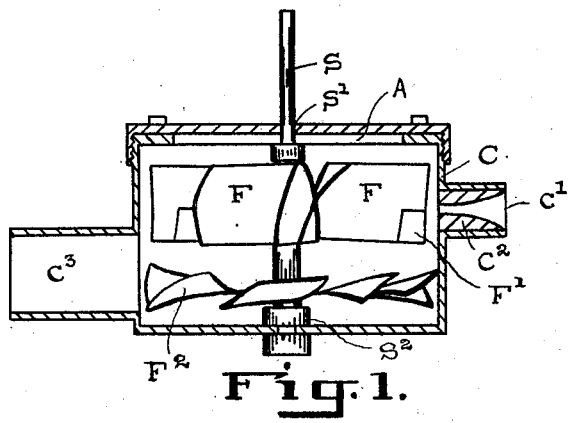
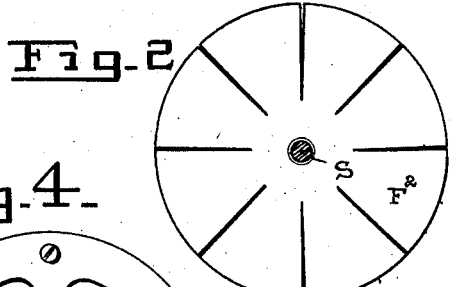
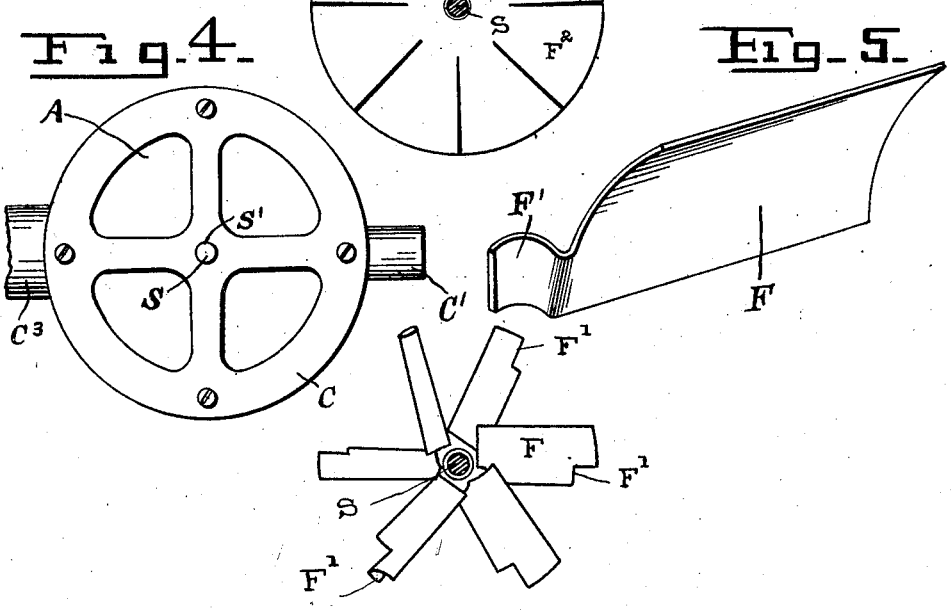
Inventor
Charles J. C. W. Hyne
By his Attorney
Wm Wallace White Patented July 17, 1923.

1,462,063

UNITED STATES PATENT OFFICE.

CHARLES JOHN CUTCLIFFE WRIGHT HYNE, OF BRADFORD, ENGLAND.

APPARATUS FOR AERATING LIQUIDS.

Application filed July 26, 1922. Serial No. 577,721.

*To all whom it may concern:*

Be it known that I, CHARLES JOHN CUTCLIFFE WRIGHT HYNE, a citizen of Great Britain and Ireland, residing at Heaton Lodge, Bradford, in the county of Yorkshire, England, have invented new and useful Improvements in Apparatus for Aerating Liquids, of which the following is a specification.

This invention relates to an apparatus for aerating liquids and it is my object to arrange and construct a simple and efficient apparatus which may be attached to a supply pipe or say a water tap, and the pressure and action of the water passing through the apparatus will efficiently aerate same, and deliver the water with the characteristics of brisk spring water, and the water will retain its aeration for some time.

Broadly the device consists of a box or chamber having an inlet and outlet and in the box is mounted a "Pelton" like wheel which may operate or have combined therewith a fan operating near an open side of the box in such wise as to draw in air and pass same substantially in the direction of the flow of the liquid and not in an opposite direction as is customary with water cooling appliances.

In describing my invention in detail reference is made to the accompanying sheet of drawings in which:—

Fig. 1 represents a sectional elevation of the apparatus.

Figs. 2 and 3 are plan views of fans or the like referred to.

Figure 4 is a plan view of the device.

Figure 5 is a perspective of one of the fan blades.

To carry my invention into effect the simplest form of apparatus comprises a circular chamber or casing C having an inlet C' with connecting means to a suitable supply pipe, the inlet C' being preferably provided with a nozzle $C^2$. There is an outlet $C^3$ arranged substantially as shewn in Fig. 1, wherein the apparatus is shewn with a vertical axis. In practice the axis will be horizontal.

On one side the casing C will be open as at A or be provided with openings to permit of air entering. On a suitable shaft S operating in or carried by suitable bearings such as S' and $S^2$ I mount a wheel or fan F having its vanes so constructed, such as by bending portions at F' Figs. 1 and 3, as to form a "Pelton" like wheel to one edge and a fan at or towards the other edge. The entering water or liquid will turn the wheel and fan, the vanes of the latter being constructed to draw in air. The rotary movement will mix the air and liquid and deliver same to the outlet $C^3$.

In order to further break up and intermix the air and water or like I may mount on the shaft S either loosely or attached thereto one or more fan like wheels $F^2$ Figs. 1 and 2. It is preferred to mount the fan loosely on the shaft. The main fan like wheel F may also be mounted loosely on its shaft but in some forms of construction the main fan may be attached to the shaft.

I have described the "Pelton" like wheel and air fan as one wheel but these may be separate so long as they are arranged so that the motion of the "Pelton" or water wheel will operate the air fan.

Where the water wheel is attached to the shaft and there is a constant supply of water or like being treated the shaft may be used as a source of power.

Condensed water is invariably "flat" and stale tasting therefore the process of aeration is of considerable advantage and the apparatus described will be found exceedingly useful where a head due to volume or fall may be obtained.

The device is simple and not costly and will be found remarkably efficient for its purpose.

I declare that what I claim is:—

An aerating device of the class described comprising a casing having a cylindrical shape and provided at one end with means for the admission of air, a water supply nozzle at one side of the casing adjacent the open end thereof, a water outlet tube at the opposite side of the casing adjacent the remaining end thereof, a shaft mounted axially of the casing, a combined fan and water wheel fixed on said shaft adjacent the open end of the casing, said fan and water wheel having a series of blades each curved at the portion adjacent the open end of the casing to constitute a fan element arranged to draw air in through said open end, said blades each further having a portion remote from the open end of the casing arranged to pass in front of said nozzle and shaped to form an impeller bucket, and an agitator on said shaft below the fan having propeller like blades and positioned opposite the outlet tube whereby to mix the air and water in said casing.

CHARLES JOHN CUTCLIFFE WRIGHT HYNE.

Witness:
C. WAUGH.